United States Patent
Chen

[11] Patent Number: 5,886,686
[45] Date of Patent: Mar. 23, 1999

[54] KEYBOARD WITH REPLACEABLE CURSOR CONTROL MEANS

[76] Inventor: Frank Chen, 2F, No. 2, Alley 10, Lane 131, Sec. 1, Chung Jen Rd., Taipei, Taiwan

[21] Appl. No.: 731,729

[22] Filed: Oct. 21, 1996

[51] Int. Cl.$^6$ .................................................. G09G 5/00
[52] U.S. Cl. ........................ 345/168; 345/157; 345/167; 345/173
[58] Field of Search .................... 345/168, 156, 345/157, 163, 167, 169, 173; 364/708.1, 709.11, 709.01; 361/680, 681, 683, 686

[56] References Cited

U.S. PATENT DOCUMENTS

| | | | |
|---|---|---|---|
| 5,021,771 | 6/1991 | Lackman | 345/157 |
| 5,049,863 | 9/1991 | Oka | 345/163 |
| 5,126,723 | 6/1992 | Long et al. | 345/157 |
| 5,301,132 | 4/1994 | Lakahane | 364/708.1 |
| 5,416,479 | 5/1995 | Jondrow et al. | 345/157 |
| 5,416,498 | 5/1995 | Grant | 345/168 |
| 5,428,355 | 6/1995 | Jondrow et al. | 345/157 |
| 5,528,523 | 6/1996 | Yoshida | 345/157 |
| 5,546,334 | 8/1996 | Hsieh et al. | 364/709.11 |
| 5,594,617 | 1/1997 | Foster et al. | 364/708.1 |

*Primary Examiner*—Xiao Wu

[57] ABSTRACT

A keyboard having an open chamber in a wrist rest thereof adapted for receiving a track ball and a touch input device alternatively, permitting the track ball or touch signal device to be electrically connected to the internal circuit of the keyboard for signal input. A packing block is provided for mounting in the open chamber of the wrist rest in a flush manner when the track ball and the touch input device are not used.

7 Claims, 5 Drawing Sheets

KEYBOARD WITH REPLACEABLE CURSOR CONTROL MEANS

BACKGROUND OF THE INVENTION

The present invention relates to keyboards, and relates more particularly to such a keyboard which has an open chamber in a wrist rest thereof for the installation of a track ball and a touch input device alternatively.

A keyboard is the most commonly used data input device for inputting data into a computer system. However, it is not efficient to control the movement of a cursor in a monitor of a computer system through a keyboard. For efficiently controlling the movement of a cursor in a monitor of a computer system, a mouse, track ball, or touch input device may be used. There are computer keyboards equipped with a track ball or touch input device. However, because the track ball or touch input device is fixedly installed in the keyboard, it cannot be replaced by a different cursor control device. Therefore, an user may have to prepare two different types of keyboards, i.e., one with a track ball and one with a touch input device for use in different situations.

SUMMARY OF THE INVENTION

The present invention has been accomplished to provide a keyboard which can be installed with a track ball and a touch input device alternatively. According to one aspect of the present invention, the keyboard comprises a wrist rest at a front side therefore and an open chamber in the wrist rest for the installation of a track ball and a touch input device alternatively. The wrist rest comprises two longitudinal sliding grooves bilaterally disposed in the open chamber at the bottom, a locating hole disposed in the middle of the open chamber at the bottom, and an electrical connector disposed inside the open chamber and connected to the internal circuit of the keyboard. The track ball and the touch input device each has two rails at two opposite sides adapted for inserting into the sliding grooves in the open chamber of the wrist rest, a locating block at the bottom adapted for fitting into the locating hole in the open chamber of the wrist rest, and an electrical connector adapted for connecting to the electrical connector of the wrist rest of the keyboard for signal transmission. According to another aspect of the present invention, a packing block is provided for fitting into the open chamber of the wrist rest of the keyboard to seal up the gap when the track ball and the touch input device are not used.

DETAILED DESCRIPTION OF THE PREFERRED EMBODIMENT

Figure 1:
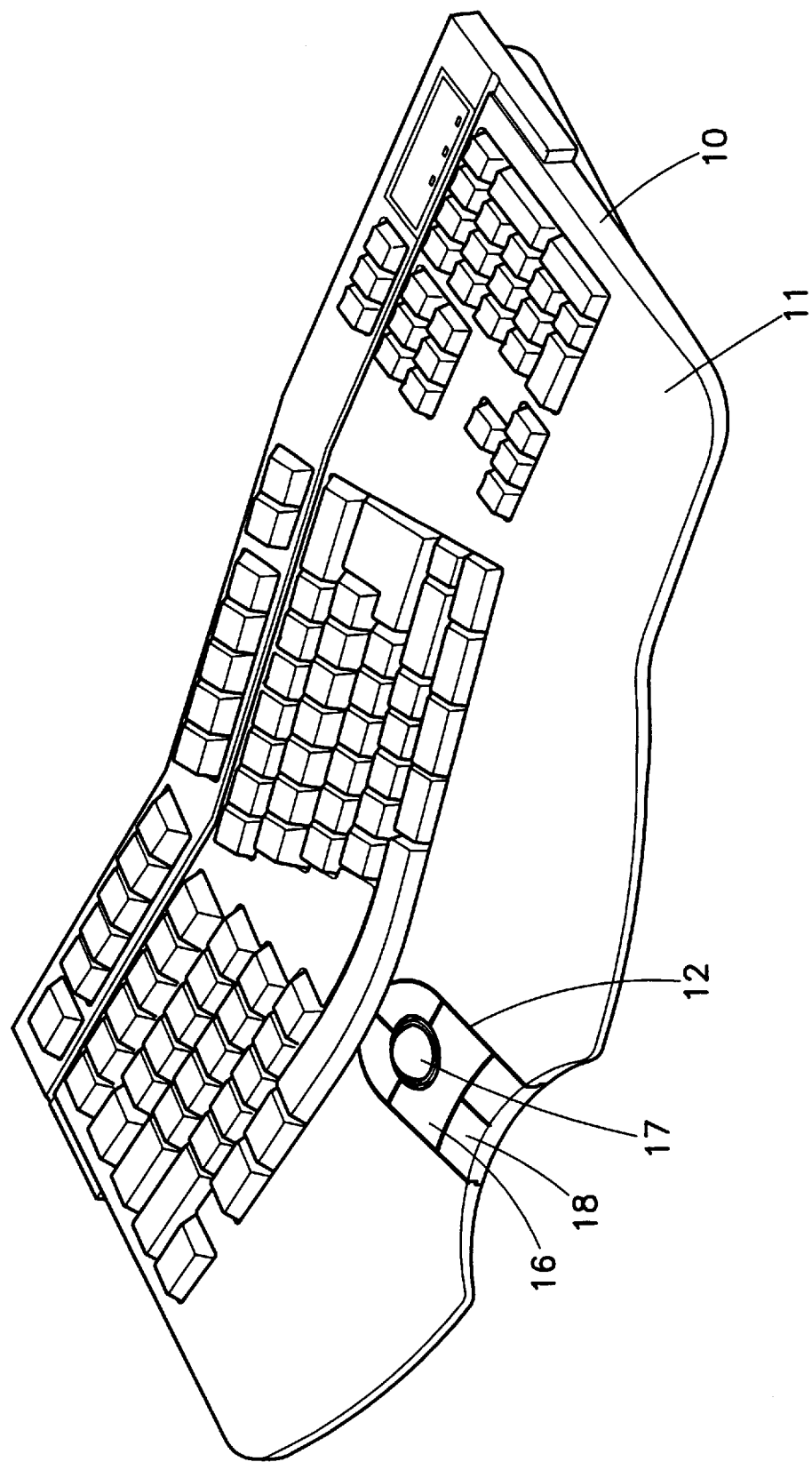
FIG. 1 is an elevational view of a keyboard according to the present invention, showing a track ball installed in the wrist rest.
Figure 2:
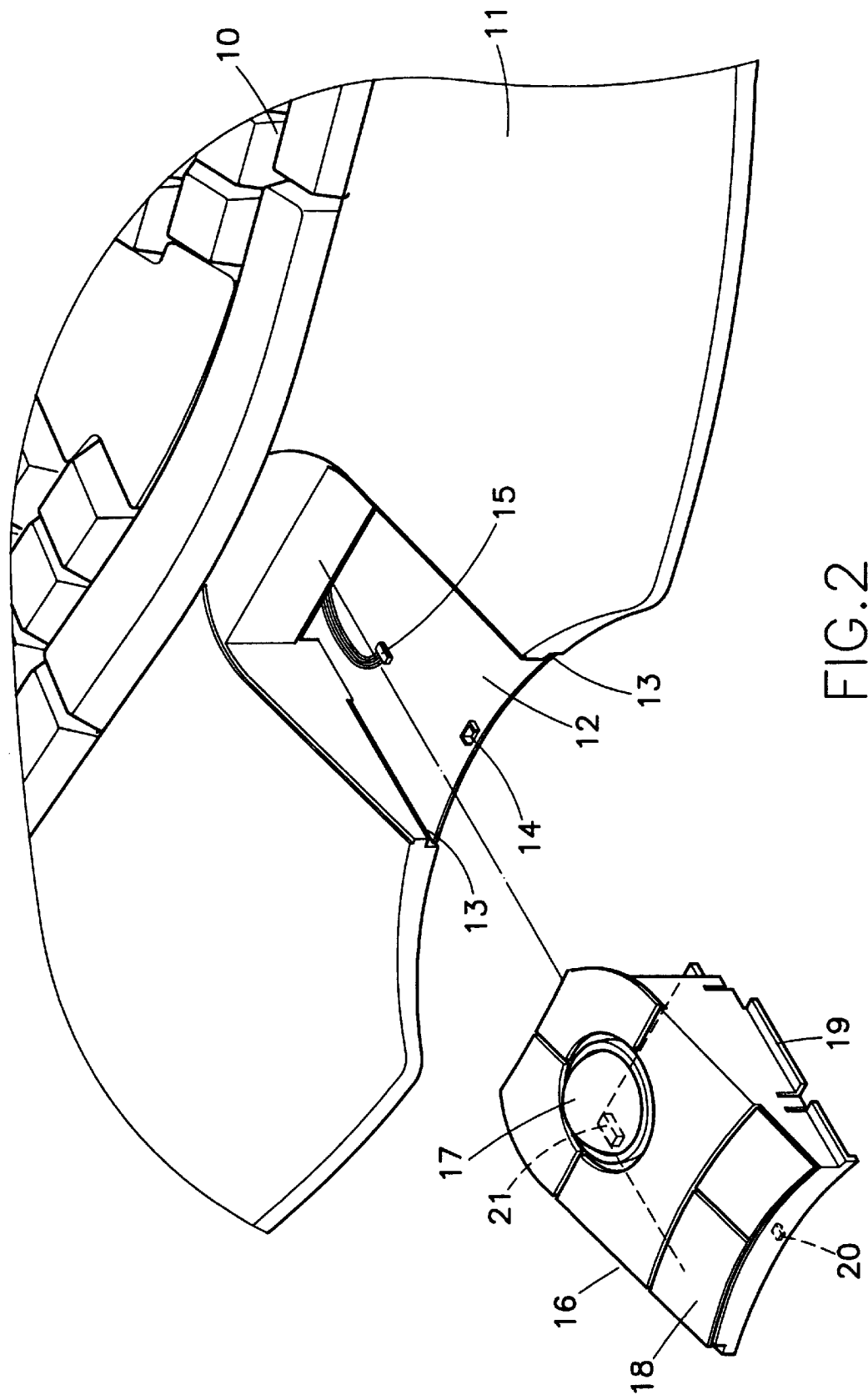
FIG. 2 is an exploded view of the present invention, showing the track ball removed from the open chamber of the wrist rest.
Figure 3:
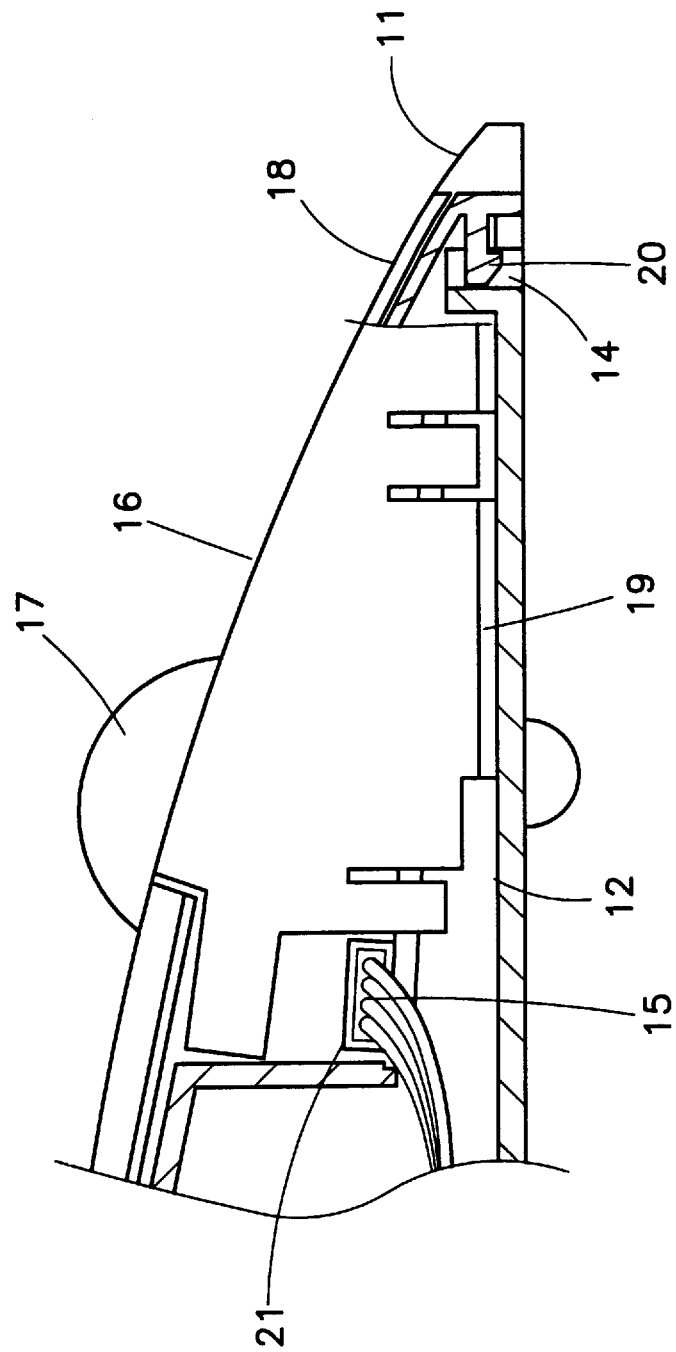
FIG. 3 is a side plain view of a part of FIG. 1 showing the track ball secured to the inside of the open chamber of the wrist rest.

Referring to FIGS. 1, 2 and 3, the keyboard, referenced by 10, comprises an orthopedically engineered wrist rest 11 at the front side adjacent to the user for the resting of the wrists of the user's hands when the user operates the keyboard 10. The wrist rest 11 comprises an open chamber 12 extended to the front side, two sliding grooves 13 bilaterally disposed in the open chamber 12 at the bottom, a locating hole 14 at the bottom of the open chamber 12 near the front side. An electrical connector 15 is disposed inside the open chamber 12 and connected to the internal circuit of the keyboard 10. A track ball 16 is provided, and adapted for mounting in the open chamber 12 of the wrist rest 11 and connecting to the electrical connector 15 for controlling the movement of the cursor in a monitor of a computer system to which the keyboard 10 is electrically connected. The track ball 16 comprises a ball 17, a plurality of buttons 18, and an internal circuit (not shown). As the ball 17, buttons 18 and internal circuit of the track ball 16 are of the known designs and not within the scope of the present invention, they are not described in detail. The track ball 16 comprises two rails 19 at two opposite sides adapted for inserting into the sliding grooves 13 of the open chamber 12 of the wrist rest 11, a locating block 20 raised from the bottom side and adapted for fitting into the locating hole 14, and an electrical connector 21 connected to the internal circuit and adapted for connecting to the electrical connector 15 of the keyboard 10. When the rails 19 of the track ball 16 are respectively inserted into the sliding grooves 13 of the open chamber 12, the electrical connector 21 of the track ball 16 is connected to the electrical connector 15 of the keyboard 10, and then the locating block 20 of the track ball 16 is forced into engagement with the locating hole 14 of the open chamber 12 to secure the track ball 16 to the inside of the open chamber 12 of the wrist rest 11 of the keyboard 10.

Figure 4:
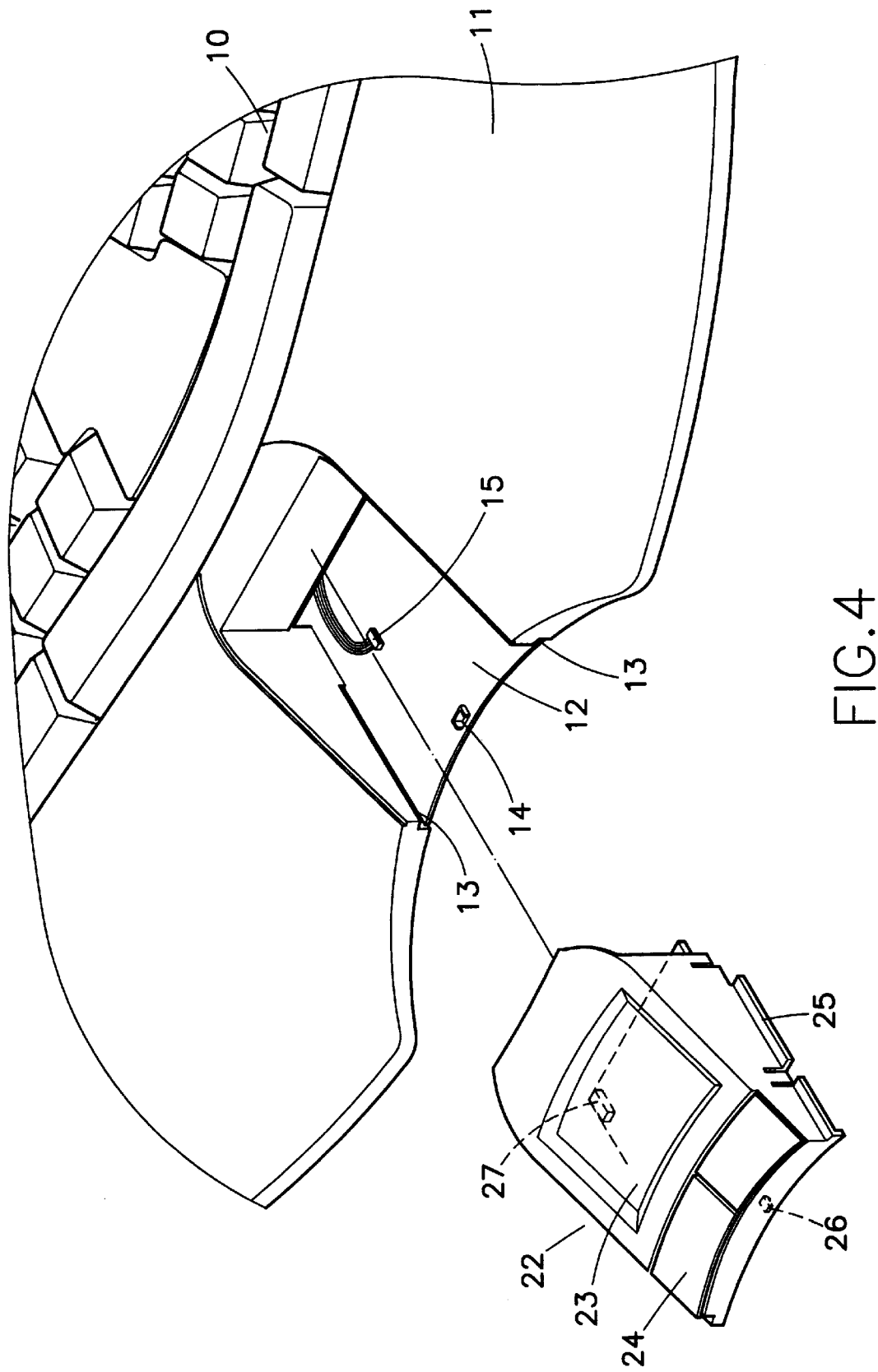
FIG. 4 shows the relationship between the keyboard and the touch input device according to the present invention; and, FIG. 5 shows the relationship between the keyboard and the packing block according to the present invention.

Referring to FIG. 4, a touch input device 22 may be used and installed in the open chamber 12 of the wrist rest 11 of the keyboard 10 to replace the track ball 16. The touch input device 22 comprises a digitizer tablet 23, a plurality of buttons 24, and an internal circuit, and is adapted for inputting signals into a computer system and controlling the movement of a cursor in a monitor of the computer system. The touch input device 22 further comprises two rails 25 at two opposite sides adapted for inserting into the sliding grooves 13 of the open chamber 12 of the wrist rest 11, a locating block 26 raised from the bottom side and adapted for fitting into the locating hole 14, and an electrical connector 27 connected to the internal circuit and adapted for connecting to the electrical connector 15 of the keyboard 10. When the rails 25 of the touch input device 22 are respectively inserted into the sliding grooves 13 of the open chamber 12, the electrical connector 27 of the touch input device 22 is connected to the electrical connector 15 of the keyboard 10, and then the locating block 26 of the touch input device 22 is forced into engagement with the locating hole 14 of the open chamber 12 to secure the touch input device 22 to the inside of the open chamber 12 of the wrist rest 11 of the keyboard 10.

Figure 5:
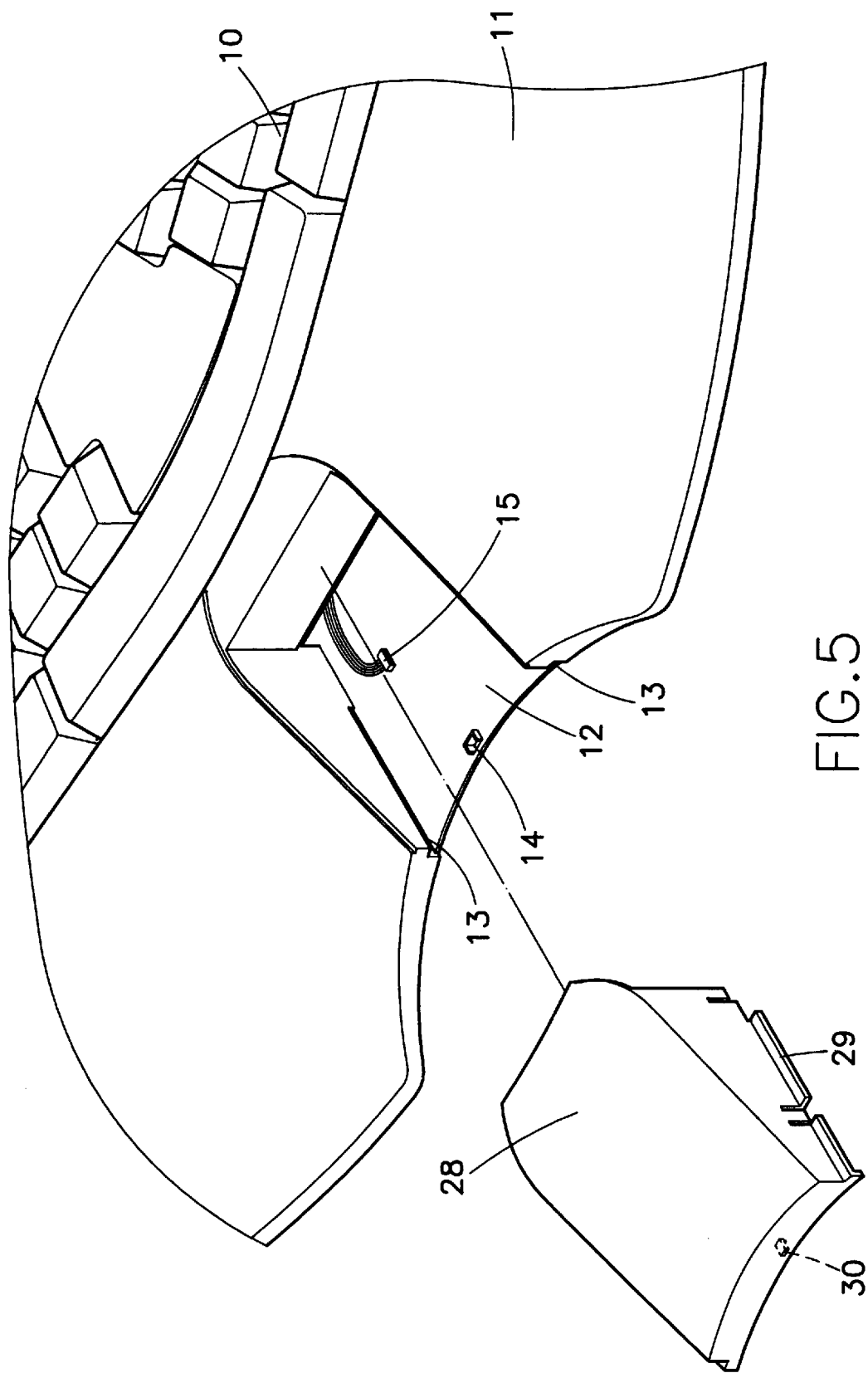

Referring to FIG. 5, a packing block 28 is provided for fitting into the open chamber 12 of the wrist rest 11 of the keyboard 10 when neither the track ball 15 nor the touch input device 22 is used. The packing block 28 comprises two rails 29 at two opposite sides adapted for inserting into the sliding grooves 13 of the open chamber 12 of the wrist rest 11, and a locating block 30 raised from the bottom side and adapted for fitting into the locating hole 14. When the rails 29 of the packing block 28 are respectively inserted into the sliding grooves 13, the locating block 30 is forced into engagement with the locating hole 14 to secure the packing block 28 in place. When the packing block 28 is installed in the open chamber 12, the top side of the packing block 28 is disposed in flush with the top side of the wrist rest 11.

It is to be understood that the drawings are designed for purposes of illustration only, and are not intended as a definition of the limits and scope of the invention disclosed.

What the invention claimed is:

1. A keyboard, comprising:

a wrist rest at a front side thereof, and a cursor control device detachably installed in said wrist rest and adapted for controlling the movement of a cursor in a monitor of a computer system to which the keyboard is connected, wherein said wrist rest includes an open chamber extending to a front side thereof, two longitudinal sliding grooves bilaterally disposed at a bottom side of said open chamber, a locating hole disposed at the bottom side of said open chamber between said sliding grooves and near the front side of said wrist rest, and an electrical connector disposed inside said open chamber and connected to an internal circuit of the keyboard, and said cursor control device includes two rails at two opposite sides adapted for insertion into the sliding grooves of said open chamber of said wrist rest, a locating block raised from a bottom side thereof and adapted to be fit into the locating hole in said open chamber of said wrist rest, and an electrical connector adapted to be connected to the electrical connector of said keyboard for signal transmission.

2. The keyboard of claim 1 wherein said cursor control device is a track ball.

3. The keyboard of claim 1 wherein said cursor control device is a touch input device.

4. The keyboard of claim 1, further comprising:

a packing block adapted to be fit into the open chamber of said wrist rest in a position flush with said wrist rest when said cursor control device is not installed in the open chamber of said wrist rest, said packing block including two rails at two opposite sides adapted for insertion into the sliding grooves in said open chamber of said wrist rest and a locating block raised from a bottom side thereof and adapted to be fit into the locating hole in said open chamber of said wrist rest.

5. A combination keyboard with interchangeable control devices apparatus, comprising:

a wrist rest at a front side thereof, and a plurality of cursor control devices each being removably receivable in said wrist rest and each being distinctly and differently adapted for controlling the movement of a cursor in a monitor of a computer system to which the keyboard is connected, wherein said wrist rest includes an open chamber extending to a front side thereof, two longitudinal sliding grooves bilaterally disposed at a bottom side of said open chamber, a locating hole disposed at the bottom side of said open chamber between said sliding grooves and near the front side of said wrist rest, and an electrical connector disposed inside said open chamber and connected to an internal circuit of the keyboard, and each cursor control device includes two rails at two opposite sides adapted for insertion into the sliding grooves of said open chamber of said wrist rest, a locating block raised from a bottom side thereof and adapted to be fit into the locating hole in said open chamber of said wrist rest, and an electrical connector adapted to be connected to the electrical connector of said keyboard for signal transmission.

6. The combination keyboard with interchangeable control devices apparatus defined in claim 5, wherein:

one of said cursor control devices is a track ball, and one of said cursor control devices is a touch input device.

7. The combination keyboard with interchangeable control devices apparatus defined in claim 6, further comprising:

a packing block adapted to be fit into the open chamber of said wrist rest in a position flush with said wrist rest when said cursor control devices are not installed in the open chamber of said wrist rest, said packing block including two rails at two opposite sides adapted for insertion into the sliding grooves in said open chamber of said wrist rest and a locating block raised from a bottom side thereof and adapted to be fit into the locating hole in said open chamber of said wrist rest.

* * * * *